United States Patent
Robinson et al.

Patent Number: 6,123,985
Date of Patent: Sep. 26, 2000

[54] METHOD OF FABRICATING A MEMBRANE-ACTUATED CHARGE CONTROLLED MIRROR (CCM)

[75] Inventors: William P. Robinson, Thousand Oaks; LeRoy H. Hackett, Woodland Hills; Philip G. Reif, West Hills, all of Calif.

[73] Assignee: Solus Micro Technologies, Inc., Westlake Village, Calif.

[21] Appl. No.: 09/179,860

[22] Filed: Oct. 28, 1998

[51] Int. Cl.[7] ............................. B05D 5/06; G02B 26/00; G03B 21/28
[52] U.S. Cl. ..................... 427/162; 427/163.1; 427/259; 427/266; 427/271; 427/272; 427/282; 427/287; 359/290; 359/291; 359/293; 359/230; 353/99
[58] Field of Search ............................ 427/162, 163.1, 427/271, 272, 273, 287, 259, 261, 266, 282, 289; 359/290, 293, 291, 230; 353/98, 99

[56] References Cited

U.S. PATENT DOCUMENTS

| | | | |
|---|---|---|---|
| 2,681,380 | 6/1954 | Orthuber | 178/5.4 |
| 2,682,010 | 6/1954 | Orthuber | 315/8 |
| 2,733,501 | 2/1956 | Orthuber et al. | 29/25.17 |
| 3,517,126 | 6/1970 | Yamada et al. | 178/7.5 |
| 3,600,798 | 8/1971 | Lee | 29/592 |
| 3,678,196 | 7/1972 | Roth | 178/7.5 D |
| 3,746,911 | 7/1973 | Nathanson et al. | 315/21 R |
| 3,886,310 | 5/1975 | Guldberg et al. | 178/7.5 D |
| 3,896,338 | 7/1975 | Nathanson et al. | 315/373 |
| 4,229,732 | 10/1980 | Hartstein et al. | 340/378.2 |
| 4,387,964 | 6/1983 | Arrazola et al. | 350/331 R |
| 4,441,791 | 4/1984 | Hornbeck | 350/360 |
| 4,592,628 | 6/1986 | Altman et al. | 350/486 |
| 4,615,595 | 10/1986 | Hornbeck | 353/122 |
| 4,680,579 | 7/1987 | Ott | 340/783 |
| 4,698,602 | 10/1987 | Armitage | 332/7.51 |
| 4,710,732 | 12/1987 | Hornbeck | 332/7.51 |
| 4,728,174 | 3/1988 | Grinberg et al. | 350/334 |
| 4,744,636 | 5/1988 | Haven et al. | 350/331 R |
| 4,765,717 | 8/1988 | Buzak et al. | 350/331 R |
| 4,784,883 | 11/1988 | Chitwood et al. | 428/1 |
| 4,786,149 | 11/1988 | Hoenig et al. | 350/356 |
| 4,794,296 | 12/1988 | Warde et al. | 313/105 R |
| 4,805,038 | 2/1989 | Seligson | 358/296 |
| 4,826,293 | 5/1989 | Grinberg et al. | 350/331 R |
| 4,863,759 | 9/1989 | Warde et al. | 427/108 |
| 4,884,874 | 12/1989 | Buzak et al. | 350/336 |
| 4,956,619 | 9/1990 | Hornbeck | 330/4.3 |
| 5,083,857 | 1/1992 | Hornbeck | 359/291 |
| 5,142,405 | 8/1992 | Hornbeck | 359/226 |
| 5,172,262 | 12/1992 | Hornbeck | 359/223 |
| 5,196,767 | 3/1993 | Leard et al. | 315/349 |
| 5,280,277 | 1/1994 | Hornbeck | 345/108 |
| 5,287,215 | 2/1994 | Warde et al. | 359/293 |
| 5,416,514 | 5/1995 | Janssen et al. | 348/196 |
| 5,442,414 | 8/1995 | Janssen et al. | 353/98 |
| 5,444,566 | 8/1995 | Gale et al. | 359/291 |
| 5,448,314 | 9/1995 | Heimbuch et al. | 348/743 |
| 5,452,024 | 9/1995 | Sampsell | 348/755 |

(List continued on next page.)

OTHER PUBLICATIONS

J.A. van Raalte, "A New Schlieren Light Valve for Television Projection," Applied Optics vol. 9, No. 10. (Oct. 1970), p. 2225.

R. Noel Thomas et al., "The Mirror–Matrix Tube: A Novel Light Valve for Projection Displays," IEEE Transactions on Electron Devices, vol. ED–22, No. 9, Sep. 1975, p. 765.

*Primary Examiner*—Diana Dudash
*Attorney, Agent, or Firm*—Fleshner & Kim, LLP

[57] ABSTRACT

A membrane-actuated charge controlled mirror (CCM) that exhibits increased deflection range, reduced beam current and improved electrostatic stability is fabricated using a combination of flat panel manufacturing along with traditional MEMS techniques. More specifically, a unique combination of five masking layers is used to fabricate a number of CCMs on a large glass panel. At the completion of the MEMS processing, the glass panel is diced into individual CCMs. Thereafter, the polymer mirror and membrane release layers are simultaneously released through vent holes in the membrane to leave the free-standing CCM.

15 Claims, 9 Drawing Sheets

U.S. PATENT DOCUMENTS

| | | | |
|---|---|---|---|
| 5,471,341 | 11/1995 | Warde et al. | 359/293 |
| 5,493,439 | 2/1996 | Engle | 359/292 |
| 5,504,614 | 4/1996 | Webb et al. | 359/223 |
| 5,508,738 | 4/1996 | Janssen et al. | 348/196 |
| 5,535,047 | 7/1996 | Hornbeck | 359/295 |
| 5,552,925 | 9/1996 | Worley | 359/230 |
| 5,557,177 | 9/1996 | Engle | 315/366 |
| 5,567,334 | 10/1996 | Baker et al. | 216/24 |
| 5,579,151 | 11/1996 | Cho | 359/291 |
| 5,600,383 | 2/1997 | Hornbeck | 348/771 |
| 5,631,782 | 5/1997 | Smith et al. | 359/871 |
| 5,650,881 | 7/1997 | Hornbeck | 359/871 |
| 5,669,687 | 9/1997 | Yang | 353/98 |
| 5,677,784 | 10/1997 | Harris | 359/290 |
| 5,706,061 | 1/1998 | Marshall et al. | 348/743 |
| 5,768,009 | 6/1998 | Little | 359/293 |
| 5,774,196 | 6/1998 | Marshall | 348/743 |
| 5,991,066 | 11/1999 | Robinson et al. | 359/293 |
| 6,031,657 | 2/2000 | Robinson et al. | 359/293 |
| 6,034,810 | 3/2000 | Robinson et al. | 359/293 |

METHOD OF FABRICATING A MEMBRANE-ACTUATED CHARGE CONTROLLED MIRROR (CCM)

BACKGROUND OF THE INVENTION

1. Field of the Invention

This invention relates to electrostatically-actuated light modulators and more specifically to a method of fabricating a micromirror faceplate using a combination of flat-panel manufacturing and MicroElectroMechanical Systems (MEMS) fabrication techniques.

2. Description of the Related Art

In an electrostatically-actuated light modulator, a beam of light is directed towards a light valve target that, in response to a video addressing signal, imparts a modulation onto the beam in proportion to the amplitude of the deflection of the individual reflective elements, e.g. a reflective thin-film or an array of micromirrors. The amplitude or phase modulated beam is then passed through projection optics to form the image. The target produces attractive electrostatic forces between the underlying substrate and the individual reflective elements that pull them inward toward the substrate. The amplitude of deflection corresponds to the pixel intensity in the video signal. It is well known that optical performance of the light modulator is closely tied to deflection range, electrostatic instability and resolution.

In the late 1960s, RCA developed a new Schlieren light valve that used a high energy scanning electron beam in a vacuum to address a thin metal film that is stretched over a support grid in close proximity to a glass substrate, which is described in J. A. van Raalte, "A New Schlieren Light Valve for Television Projection", Applied Optics Vol. 9, No. 10, (Oct. 1970), p. 2225. The electron beam penetrates the metal film and deposits charge on the glass substrate in proportion to the intensity of the video signal. The deposited charge produces an attractive force that deforms the metal film inward towards the substrate, which causes a portion of the reflected light to miss the stop, thereby increasing screen brightness until all the light reaches the screen. In actual operation, each pixel deforms parabolically so that light incident on the central portion of each pixel element is not deflected. This limits fill factor and optical efficiency. In addition, deflection range is limited to about 20% to maintain parabolic deformation.

More recently Optron Systems, Inc., as described in Warde et al., U.S. Pat. No. 5,287,215, has developed a membrane light modulation system in which a charge transfer plate (CTP) couples charge from a scanning electron gun under vacuum through to potential wells in atmosphere. An array of insulating posts formed in or on the CTP support a deformable reflecting membrane that spans the wells. The CTP serves as a high-density multi-feedthrough vacuum-to-air interface that both decouples the electron beam interaction from the membrane and provides the structural support required to hold off atmospheric pressure. The vacuum-to-air interface allows the reflective membrane to be built and operated in air rather than a vacuum.

Warde's membrane light modulator is fabricated by either a) removing material from the CTP's feedthroughs to form an array of recessed wells or b) photolithographically defining insulating spacers on the CTP to define the recessed wells. A polymeric membrane is deposited on the CTP over the wells such that a reliable bond between the two dielectric surfaces is established due to Van der Waals forces. The fabrication of the CTP is described in detail in U.S. Pat. Nos. 4,794,296 and 4,863,759.

As detailed in FIGS. 24–30 and column 18, line 1 to column 23, line 28 of U.S. Pat. No. 4,863,759, the high spatial resolution charge transfer feedthrough plate production assembly consists essentially of a liquid metal extruder that receives a porous insulative substrate and operates at elevated temperatures to fill each of the pores with a conductive metal. Since the production assembly must assure high resolution parallel conductors that are not shorted together and provide a very high precision vacuum seal between the feedthroughs and the insulating substrate, the process requires specially designed equipment and processing techniques that are far more expensive and less reliable than standard photolithographic techniques.

In the early 1970s, Westinghouse Electric Corporation developed an electron gun addressed cantilever beam deformable mirror device, which is described in R. Thomas et al., "The Mirror-Matrix Tube: A Novel Light Valve for Projection Displays," ED-22 IEEE Tran. Elec. Dev. 765 (1975) and U.S. Pat. Nos. 3,746,911, 3,886,310 and 3,896,338. The device is fabricated by growing a thermal silicon dioxide layer on a silicon-on-sapphire substrate. The oxide is patterned in a cloverleaf array of four centrally joined cantilever beams. The silicon is isotropically wet-etched until the oxide is undercut, leaving four oxide cantilever beams within each pixel supported by a central silicon support post. The cloverleaf array is then metallized with aluminum for reflectivity. The aluminum deposited on the sapphire substrate forms a reference grid electrode near the edges of the mirrors that is held at a d.c. bias. A field mesh is supported above the mirrors to collect any secondary electrons that are emitted from the mirrors in response to the incident primary electrons. The device is addressed by a low energy scanning electron beam that deposits a charge pattern on the cloverleaf beams, causing the beams to be deformed toward the reference grid electrode on the substrate by electrostatic actuation.

Texas Instruments has pioneered the development of the digital-mode light modulator with its digital micromirror device (DMD) that uses the pull-in problem to its advantage. The DMD employs a torsional micromirror that is fabricated on a SRAM integrated circuit and rocks back-and-forth between binary positions with the tips of the mirror being pulled down to the base electrodes. Time division multiplexing (TDM), created by rapidly rocking the mirror back-and-forth between its two positions, is used to establish different gray-levels. The electronics for implementing a TDM addressing scheme are much more complex and expensive than those required for analog modulation. Fabrication of the SRAM requires the normal 14 mask levels on a 4–5" wafer in a CMOS process. The fabrication of the 16 $\mu$m×16 $\mu$m micromirrors in a large array requires an additional 8 mask levels. The low yield from this complex processing results in a high unit cost. Furthermore, anti-stick coatings complicate the device and increase production costs significantly.

SUMMARY OF THE INVENTION

In view of the above problems, the present invention provides a low cost method of fabricating multiple membrane-actuated charge controlled mirrors (CCMs) on a single glass panel that exhibit increased deflection range, reduced beam current and improved electrostatic stability by combining large area flat panel manufacturing along with traditional MEMS techniques.

The membrane-actuated CCM includes a micromirror array that is mounted on a glass substrate and a thin insulating membrane that decouples the micromirror array from the electron beam. The membrane is supported by an array of insulating posts and is preferably patterned with an array of attractor pads that improve the field uniformity seen by each of the underlying micromirrors. The mirrors are all connected to a reference potential by an conductive grid on an equipotential layer, which also serves to shield the mirrors from any static or stray charge on the substrate that could otherwise cause instability problems. The electron beam writes a charge pattern onto the attractor pads that causes the micromirrors to deflect toward the membrane.

The membrane-actuated CCM is fabricated using large area flat panel manufacturing along with traditional MEMS techniques. More specifically, a unique combination of five masking layers is used to fabricate the CCM on a glass panel that is coated with a conductive material. A polymer release layer is patterned on the panel and coated with aluminum that is patterned to define the mirror array. Another thicker polymer release layer is patterned over the mirror array and coated with a low stress dielectric material to define the membrane. A metal layer is then patterned to define the attractor pads. At the completion of the MEMS processing, the glass panel is diced into individual CCMs. Thereafter, the mirror and post-membrane structures are simultaneously released through vent holes in the membrane to leave the free-standing CCM on a glass substrate.

These and other features and advantages of the invention will be apparent to those skilled in the art from the following detailed description of preferred embodiments, taken together with the accompanying drawings, in which:

DETAILED DESCRIPTION OF THE INVENTION

Until now, MicroElectroMechanical Systems (MEMS) fabrication closely resembled and was limited to standard semiconductor processes on relatively small wafers of 12 to 28 square inches. The present invention uses processes found in large area (270 square inches) flat panel manufacturing along with traditional MEMS techniques to fabricate a MEMS charge controlled mirror (CCM) for use in a projection display. The use of flat-panel manufacturing techniques is facilitated by replacing the row and column drivers used in current micromirror light modulators, which require wafer fabrication, with electron beam addressing. The primary structure built on a glass substrate is a metallic hinged mirror that is decoupled from the electron beam by an insulating membrane. Decoupling also allows the mirror to be designed to optimize reflectivity and exhibit a higher resonant frequency for better video performance. On a typical 470 mm by 370 mm panel, 25 microactuator arrays with over a million mirrors per array are produced simultaneously. Using only 2 micron lithography, 5 or less mask levels, and large area processing tools, these simple structures can be built with high yield at a very low cost compared to standard MEMS fabrication.

More specifically, the membrane-actuated CCM is preferably fabricated using processing equipment found in active matrix LCD flat panel display manufacturing. This equipment is ideally suited to high volume, low cost manufacturing. The technical demands of the micromirror design are such that they do not require leading edge processing equipment. Lower cost equipment that is one or two generations old relative to the state of the art will meet our technical requirements. The process flow for the production of our imager consists of two major steps: (1) fabricating the CCM on a glass faceplate and (2) joining and sealing the faceplate to the vacuum cell that houses the electron beam source, e.g. a CRT or flat-panel source such as a field emitter array (FEA). The production equipment needed to complete Step 1, fabrication of the micromirror array, includes conventional photolithography equipment, conventional thin film deposition equipment and conventional etching equipment. The production equipment needed for Step 2, while not unusual, is specialized. A vacuum assembly and sealing station must be designed to bring the three elements (CCM faceplate, seal perform and the vacuum) into the vacuum chamber, align them together with moderate precision and then heat the assembly to form the seal.

Figure 1:
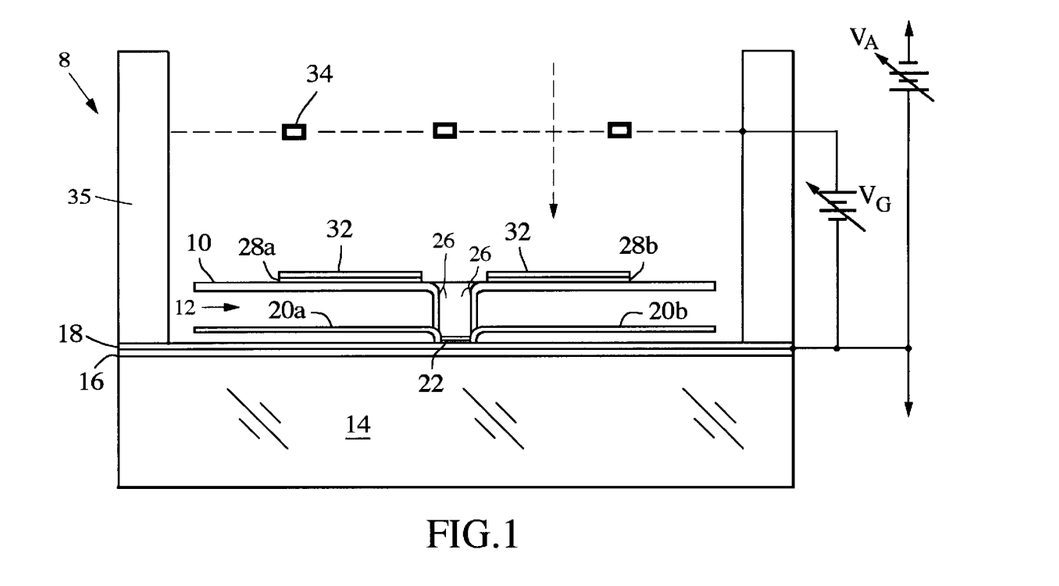
FIG. 1 is a sectional view of a membrane-actuated CCM with a cloverleaf mirror structure and perforated membrane.
Figure 2:
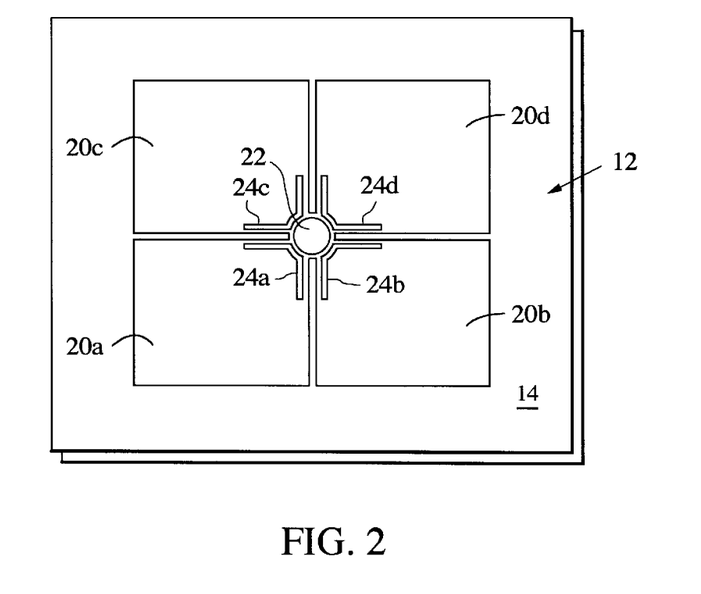
FIG. 2 is view along section 2—2 of FIG. 1 showing a plan view of a cloverleaf mirror configuration.
Figure 3:
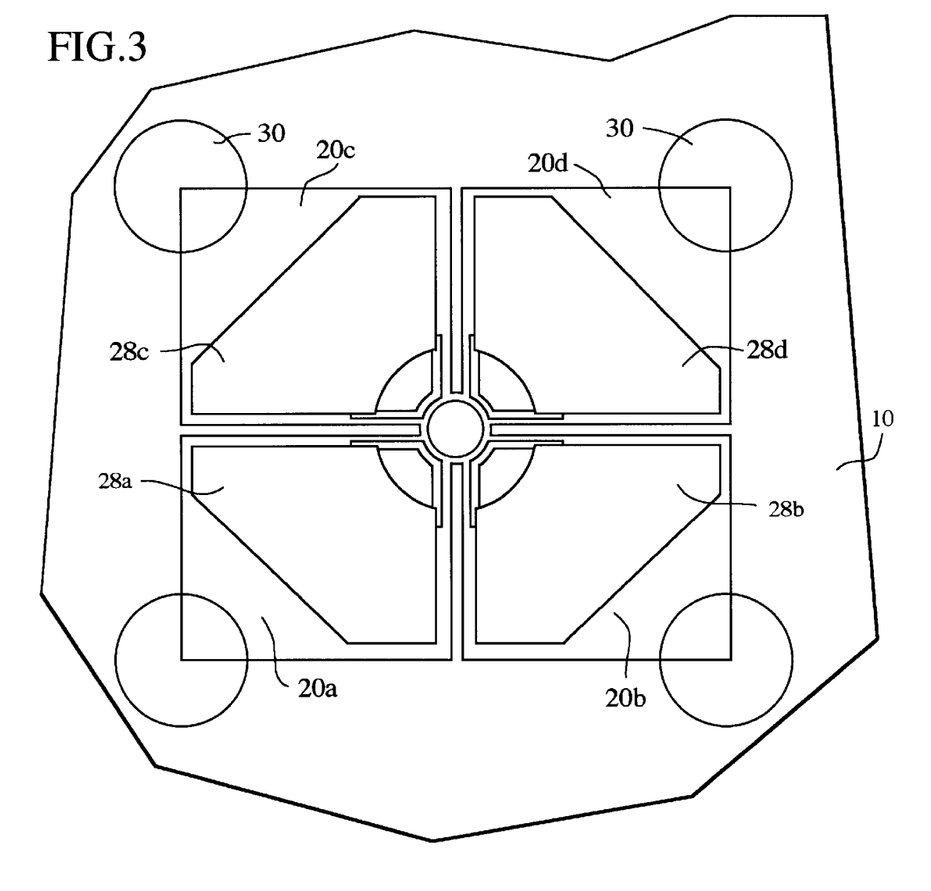
FIG. 3 is a view along section 3—3 of FIG. 1 showing a plane view of a freestanding membrane.

A currently preferred embodiment of one pixel of a membrane-actuated CCM faceplate 8 is depicted in FIGS. 1, 2 and 3. A thin insulating membrane 10 decouples an array of cantilevered micromirrors 12 on a glass substrate 14 from a source of primary electrons. Substrate 14 is preferably coated with a passivation layer 16 and a thin conducting oxide (TCO) or film (TCF) 18 that holds all of the micromirrors at anode potential and shields them from any static or stray charge that may accumulate on the substrate. A conductive grid is preferably patterned on oxide 18 to ensure the electrical continuity of the micromirrors. In this configuration the mirror layer is patterned in a cloverleaf array of four centrally joined cantilever beams 20a, 20b, 20c and 20d that are joined to a common post region 22 by hinges 24a, 24b, 24c and 24d.

Membrane 10 is formed with an integral gull-wing shaped structure in which posts 26 are supported on substrate 14 in the mirrors' common post region 22. Attractor pads 28a–28d on membrane 10 above the corresponding cantilevered beams improve the uniformity of any charge deposited on the membrane. A number of vent holes 30 in membrane 10 that are spaced between cloverleaf arrays are formed during processing to simultaneously release the micromirrors and membrane. This configuration allows the post to be relatively large in diameter with a smaller aspect ratio, which is desirable for fabrication considerations, without significantly reducing fill factor. Other multi-petal configurations are certainly within the scope of the invention. For example, a color display may use three petal RGB structures.

As shown, the diagonal of the attractor pads is approximately 60% of that of the underlying cantilever beam. This allows the cantilever beam to be deflected over approximately 80% of the mirror-to-membrane spacing without snap-over. To enhance charge efficiency, the top attractor pads are coated with a secondary emission material 32 that exhibits an emission coefficient greater than one at the desired beam energy. To further enhance charge efficiency, a corresponding array of attractor pads can be formed on the underside of membrane 10 to effectively move deposited charge closer to the mirrors.

As illustrated, the four attractor pads 28*a*–28*d* are electrically isolated from one another. As a result, each cloverleaf structure represents four distinct pixels. In some applications it may be desirable to short the attractor pads together and treat each cloverleaf structure as a single pixel. This defines a larger pixel that is easier for the beam to address.

To write a charge pattern onto the target, the source emits primary electrons that are accelerated through collector grid 34, which is biased at a positive potential $V_G$ with respect to anode potential $V_A$, and strike the attractor pads on membrane 10 causing secondary electrons to be ejected and collected by the collector grid. A thick rim 35 around the mirror array provides support for the mirrors during fabrication and may be used to hold grid 34.

The source is operated at a beam energy between the coated attractor pads' first and second crossover points so that the deposition of charge onto membrane 10 modulates the potential of each pixel with respect to the reference potential. With the coated membrane, the charge pattern exhibits a net positive charge that increases the localized membrane potentials with respect to the mirror array's anode potential, which in turn produces attractive forces that tend to pivot and deflect the mirrors towards the membrane. The attractive force is opposed by the hinge's spring force and the amount of deflection is determined by the force rebalance equation for a given geometry. The mirror deflection in turn imparts a modulation onto a beam of light.

Figure 4A:
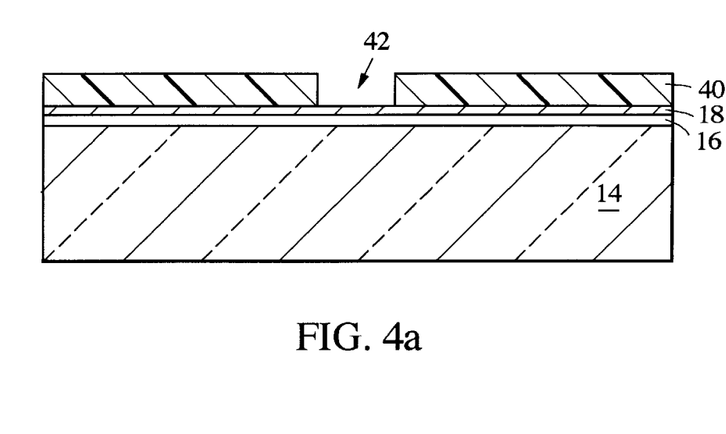
FIGS. 4a through 4g are sectional views of the fabrication process of the membrane-actuated CCM shown in FIGS. 1–3.

The membrane-actuated CCM faceplate is fabricated using large area flat panel manufacturing along with traditional MEMS techniques as shown in FIGS. 4*a*–4*g* and 5*a*–5*g*. More specifically, a unique combination of five masking layers are used to fabricate the micromirror arrays on a glass substrate 14 that has is coated with passivation layer 16 and TCO or TCF 18. As shown in FIGS. 4*a* and 5*a*, a polymer material, preferably a photodefinable polymer such as PMMA or polyamide, is patterned on glass substrate 14 using mask 1, a mirror release mask, to form a release layer 40 for the micromirror array. The patterned release layer 40 is suitably a few microns thick and exposes a post region 42 approximately 15–20 microns wide.

Figure 4B:
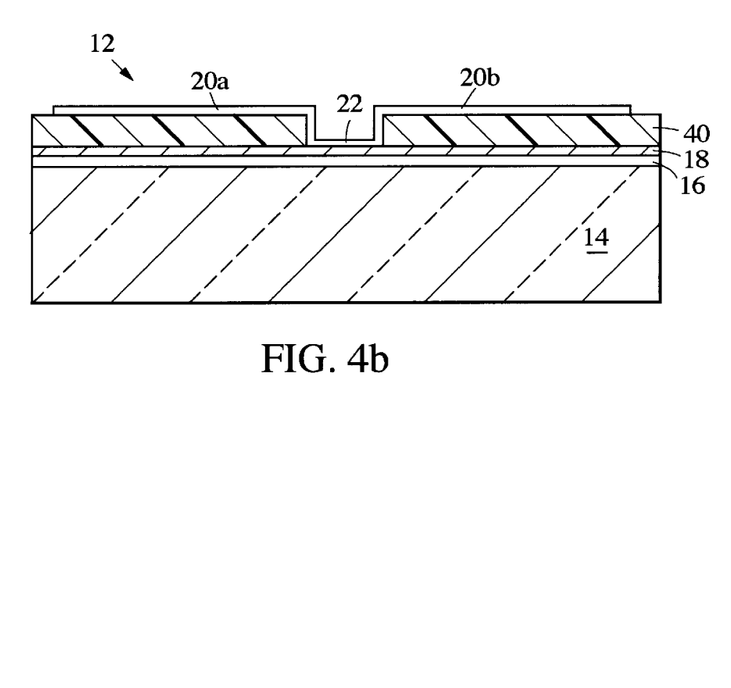
Figure 5A:
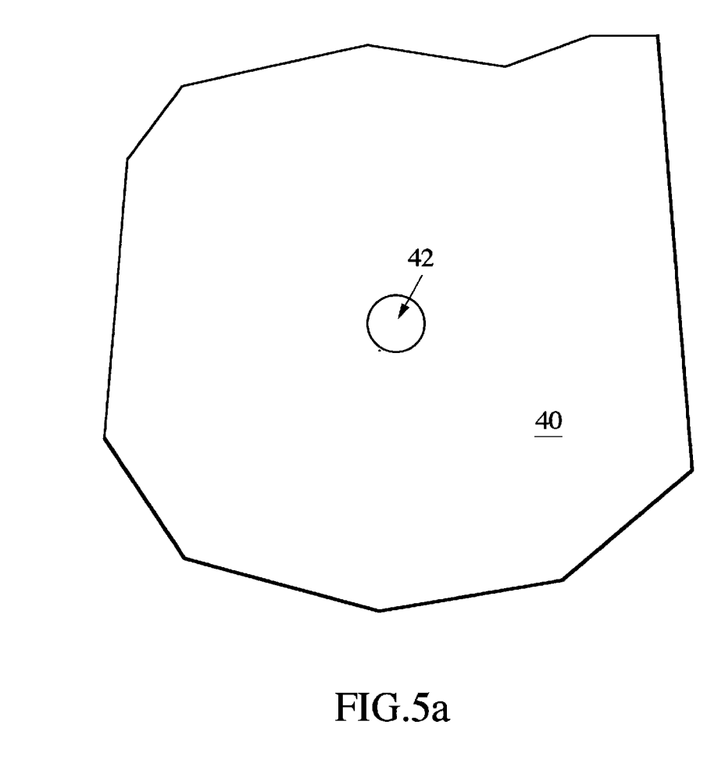
FIGS. 5a through 5g are plan views of the fabrication process of the membrane-actuated CCM shown in FIGS. 1–3.
Figure 5B:
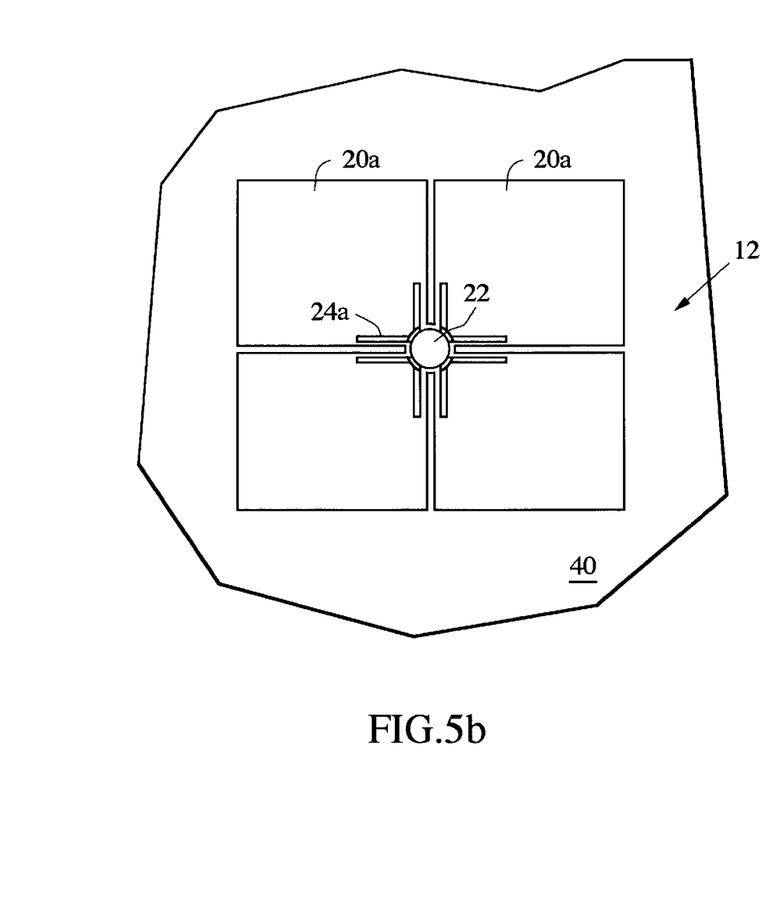

Release layer 40 is then coated with a few hundred nanometers of low stress metal, e.g. aluminum and patterned using mask 2, a mirror metal mask, to define the micromirrors 12 and conductive grid as shown in FIGS. 4*b* and 5*b*. The metal is suitably patterned using standard wet etch or reactive ion etching (RIE) processes. In this configuration the mirror layer is patterned in a cloverleaf array of four centrally joined cantilever beams 20*a*, 20*b*, 20*c* and 20*d* that are joined to common post region 22 by hinges 24*a*, 24*b*, 24*c* and 24*d*.

Figure 4C:
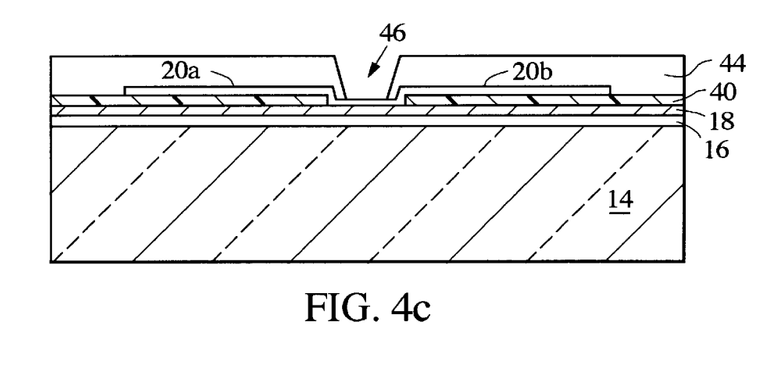
Figure 5C:
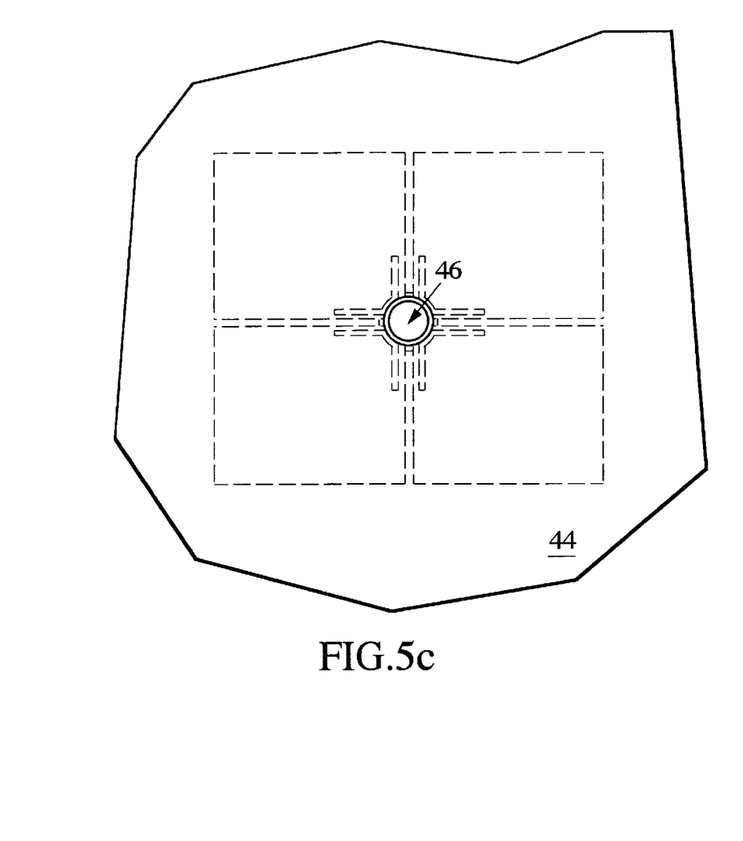

As shown in FIGS. 4*c* and 5*c*, a second polymer material such as PMMA or polyamide is patterned using mask 3, a membrane release mask, to form a membrane release layer 44 for the post-membrane structure. The patterned release layer 44 is suitably 5–15 microns thick and exposes a common post region 46 that is aligned to and slightly narrower than post region 42 defined in the first masking step. It may be possible to use a photodefinable polymer such as PMMA or SU-8 and standard wet etch techniques to form release layer 44. However, due to its thickness, release layer 44 will tend to exhibit a lot of stress. As a result, it may be necessary to use RIE to etch a polymer such as polyamide through a hard mask in order to achieve the desired flatness and definition.

Figure 4D:
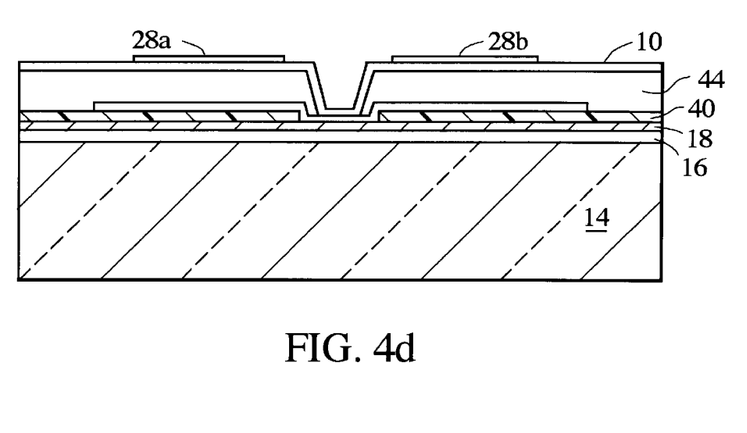
Figure 5D:
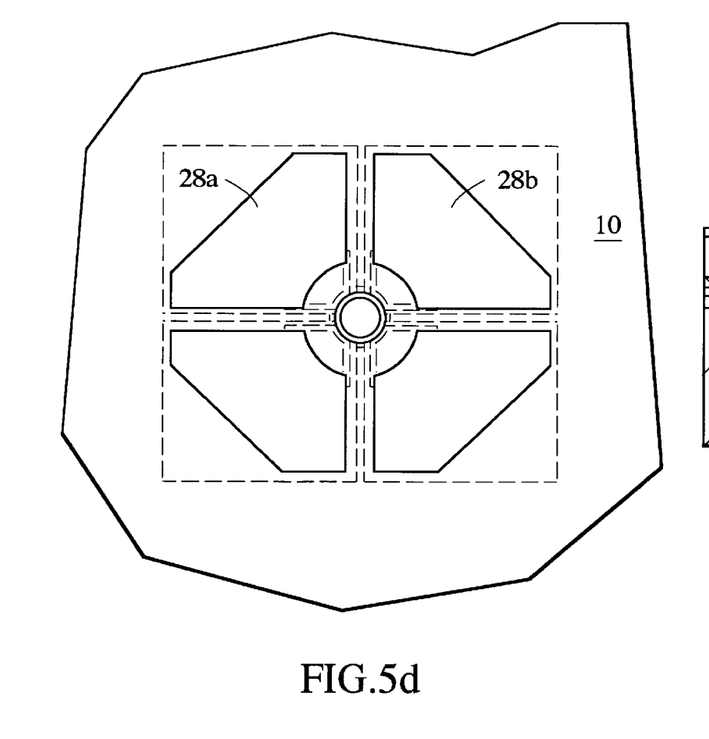

As shown in FIGS. 4*d* and 5*d*, a thin layer, e.g. 0.5–2 microns, of a low stress dielectric material such as $SiO_2$ or $Si_2N_3$ is deposited onto release layer 44 using, for example, a sputter or Plasma Enhanced Chemical Vapor Deposition (PECVD) process to produce insulating membrane 10. The membrane must be thick enough to maintain structural integrity and stop incident electrons from penetrating through to the mirrors. In addition, the material must be deposited in such a manner as to control stress in membrane 10. If membrane 10 is under compressive stress, it will tend to deform when the structure is released. Preferably, the material is deposited so that membrane 10 is under tensile stress.

The membrane layer is coated with a thin aluminum layer and patterned using mask 4, an attractor pad mask, to define top attractor pads 28 that are aligned with the underlying micromirrors 12. This may be done using either a wet etch or RIE. Note that prior to depositing the membrane layer, bottom attractor pads may be patterned on the release layer using the same mask 4. When released, the bottom attractor pads would adhere to membrane 10 and serve to move the deposited charge closer to the micromirrors.

Figure 4E:
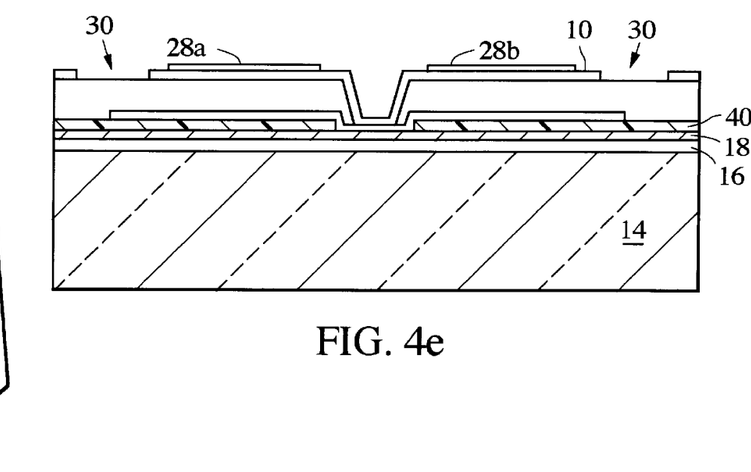
Figure 4F:
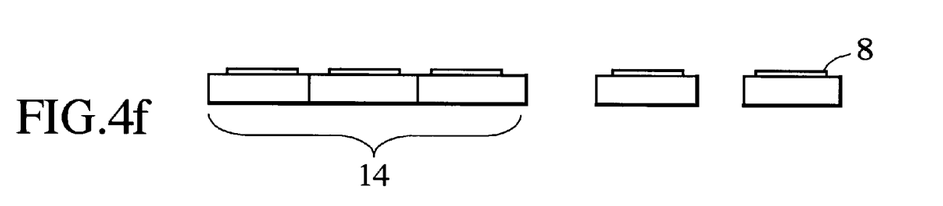
Figure 4G:
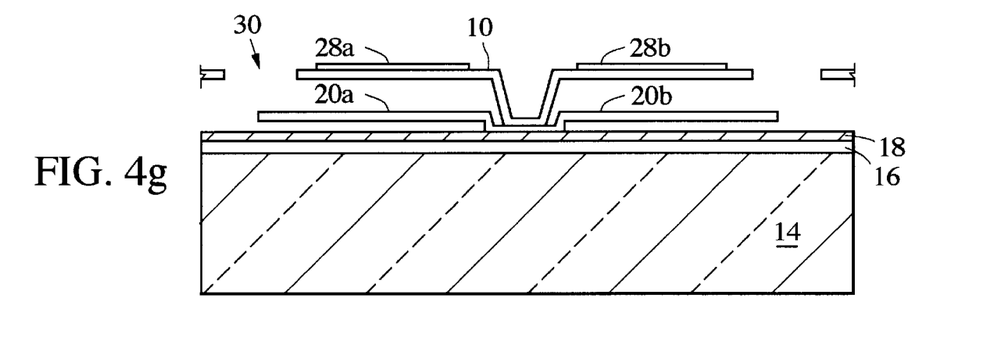
Figure 5E:
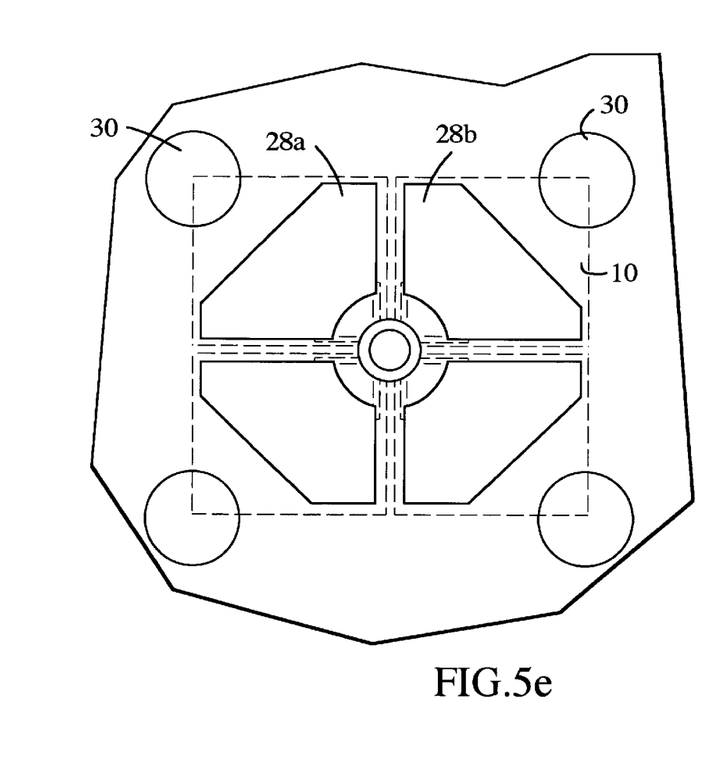
Figure 5F:
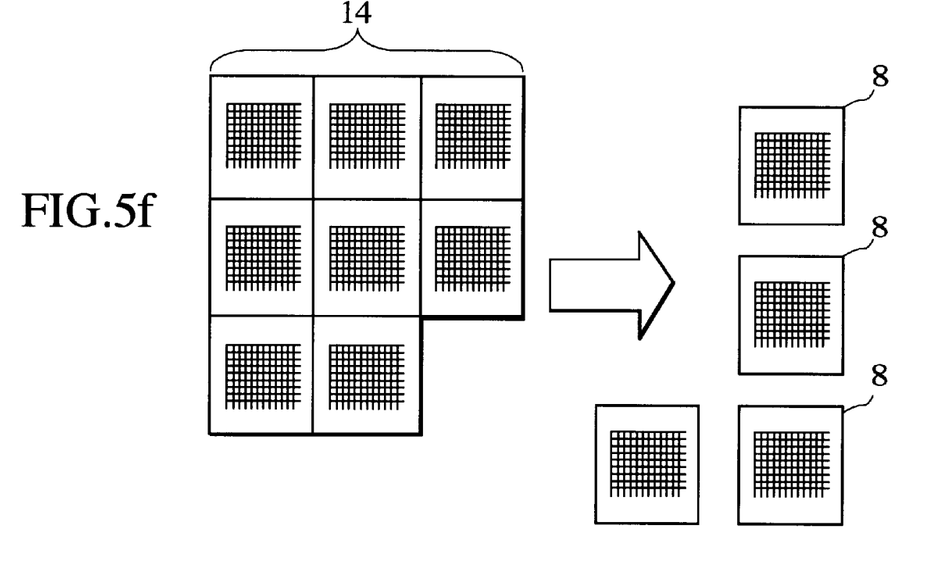
Figure 5G:
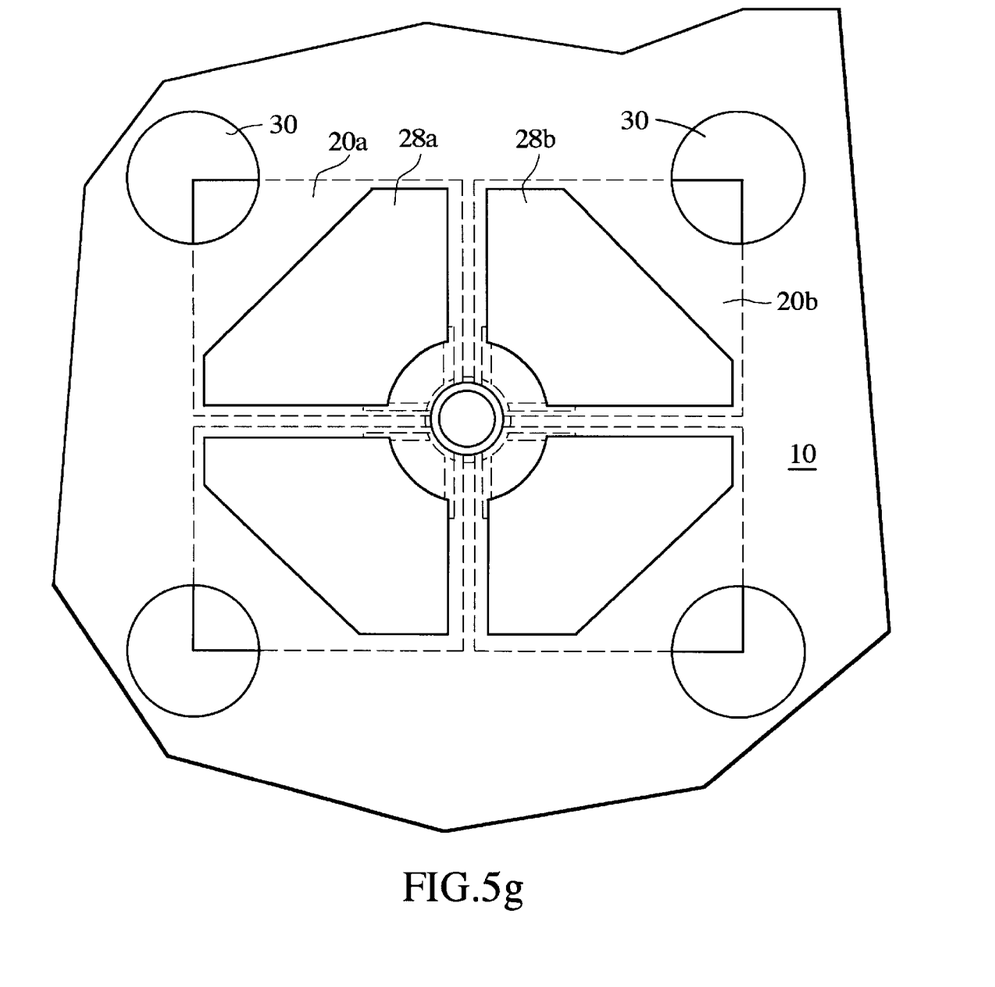

At this point, the device may be coated with a secondary emission material (SEM) such as MgO to enhance secondary emission. Lastly, vent holes 30 are patterned in membrane 10 between micromirrors 12 using mask 5, a membrane vent mask, and standard wet etch or RIE processing as shown in FIGS. 4*e* and 5*e*. At the completion of processing but prior to release, the glass panel 14 is diced into individual CCMs 8 as shown in FIGS. 4*f* and 5*f*. The ability to fabricate several devices on a single glass panel is critical to reducing the cost of each CCM. Thereafter, the micromirror and post-membrane polymer release layers, 40 and 44, are simultaneously released by ashing to leave the free-standing CCM on a glass substrate as shown in FIGS. 4*g* and 5*g*.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A method of fabricating a micromirror faceplate, comprising:

patterning a mirror release layer onto a glass panel including defining mirror post regions that expose portions of said glass panel through said mirror release layer;

patterning a metal layer over said mirror release layer to form an array of micromirrors including mirror post regions that are anchored to the exposed portions of said glass panel;

patterning a membrane release layer over said metal layer with membrane post regions that are aligned with said mirror post regions and that expose portions of said metal layer through said membrane release layer;

patterning an insulating material over said membrane release layer to form a membrane that is anchored to the exposed portions of said metal layer by membrane post regions at said mirror post regions and has an array of vent holes that are spaced between the underlying micromirrors; and simultaneously releasing said mirror and membrane release layers through said vent holes so that the membrane is suspended above said glass panel and above the array of micromirrors by said membrane post regions.

2. The method of claim 1, wherein said mirror and membrane release layers comprise a polymer material.

3. The method of claim 2, wherein said mirror release layer comprises a photodefinable polymer material.

4. The method of claim 1, wherein said membrane is under tensile stress.

5. The method of claim 1, further comprising patterning another metal layer over said membrane to define an array of attractor pads that lie above the micromirror array and the membrane such that the array of attractor pads aligns with the micromirror array.

6. The method of claim 1 wherein said glass panel is coated with a transparent conductive material, said patterned release layer exposing said transparent conductive material so that it electrically shorts all of said micromirrors together through interconnection with the mirror post regions.

7. A method of fabricating a plurality of micromirror faceplates, comprising:

patterning a first polymer release layer onto a glass panel including defining mirror post regions that expose portions of said glass panel through the first polymer release layer;

patterning a metal layer over said polymer release layer to form an array of micromirrors including mirror post regions that are anchored to the exposed portions of said glass panel;

patterning a second polymer release layer over said metal layer with membrane post regions that are aligned with said mirror post regions and that expose portions of said metal layer through said second polymer release layer;

patterning an insulating material over said second polymer release layer to form a membrane including membrane post regions that is anchored to the exposed portions of said metal layer by said membrane post regions at said mirror post regions and has an array of vent holes that are spaced between the underlying micromirrors;

dicing the glass panel into individual micromirror faceplates; and for each faceplate, simultaneously releasing said first and second polymer release layers through said vent holes so that the membrane is suspended above said glass panel and above the array of micromirrors by said membrane post regions.

8. The method of claim 7, wherein said membrane is under tensile stress.

9. The method of claim 7, further comprising patterning another metal layer over said membrane to define an array of attractor pads that lie above the micromirror array and the membrane such that the array of attractor pads aligns with the micromirror array.

10. The method of claim 7 wherein said glass panel is coated with a transparent conductive material, said first polymer release layer exposing said transparent conductive material so that it electrically shorts all of said micromirrors together through interconnection with the mirror post regions.

11. A method of manufacturing a plurality of micromirror faceplates, comprising:

providing a large area glass panel;

using microelectromechanical systems (MEMS) techniques to define an array of micromirrors that are anchored to the glass panel in distinct post regions and an insulating membrane that is also anchored to the glass panel in the same post regions, said micromirrors and said membrane being spaced from said glass panel by mirror and membrane release layers, respectively;

dicing the glass panel into individual micromirror faceplates; and for each faceplate, simultaneously releasing said mirror and membrane release layers through vent holes in the membrane so that the membrane is suspended above said glass panel and above the array of micromirrors.

12. The method of claim 11, wherein said mirror and membrane release layers comprise a polymer material.

13. The method of claim 11, wherein said membrane is under tensile stress.

14. The method of claim 11, further comprising patterning another metal layer over said membrane to define an array of attractor pads that lie above said micromirrors.

15. The method of claim 11, wherein said glass panel is coated with a transparent conductive material, said patterned mirror release layer exposing said transparent conductive material so that it electrically shorts all of said micromirrors together through interconnection with said micromirrors at said post regions.

* * * * *